US011318642B2

(12) United States Patent
Campbell et al.

(10) Patent No.: US 11,318,642 B2
(45) Date of Patent: May 3, 2022

(54) PERMEABLE WALL ENCAPSULATION MOLD

(71) Applicant: Eaton Intelligent Power Limited, Dublin (IE)

(72) Inventors: Louis G. Campbell, Elmira, NY (US); Ganesh Kumar Balasubramanian, Horseheads, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/722,834

(22) Filed: Dec. 20, 2019

(65) Prior Publication Data
US 2021/0187798 A1    Jun. 24, 2021

(51) Int. Cl.
*B29C 39/36*     (2006.01)
*B29C 39/10*     (2006.01)
(Continued)

(52) U.S. Cl.
CPC .............. *B29C 39/36* (2013.01); *B29C 39/10* (2013.01); *B29C 39/26* (2013.01); *B29K 2083/005* (2013.01); *B29L 2031/34* (2013.01)

(58) Field of Classification Search
None
See application file for complete search history.

(56) References Cited

U.S. PATENT DOCUMENTS 2,331,000 A * 10/1943 Shaefer ................... B28B 21/08
                                                                425/437
2,584,109 A *  2/1952 Blackburn ............... B28B 7/12
                                                                 264/86
(Continued)

FOREIGN PATENT DOCUMENTS

CN       204295979 U     4/2015
CN       105895786 A     8/2016
(Continued)

OTHER PUBLICATIONS

European Patent Office "Written Opinion of the International Preliminary Examining Authority", for corresponding International application No. PCT/EP2020/025569, dated Dec. 8, 2021, 13 pp.

*Primary Examiner* — Edmund H Lee
(74) *Attorney, Agent, or Firm* — Eckert Seamans Cherin & Mellott, LLC

(57) ABSTRACT

A mold for encapsulating an electrical component. The mold includes an encapsulation chamber and an air inlet. The encapsulation chamber is defined by a housing, an open top, and a solid bottom. The housing includes a solid outer wall, a permeable inner wall, and an air chamber between the solid outer wall and the inner wall. The air inlet is configured to introduce a gas into the air chamber. The encapsulation chamber is sized and shaped to receive the electrical component while leaving a gap for the introduction of encapsulant around the electrical component. The encapsulant may be silicone rubber. To remove an encapsulated electrical component, pressurized air may be introduced through the air inlet into the air chamber, passing through the permeable inner wall, separating the outer surface of the encapsulant from the housing, and allowing the combination casting to be removed from the mold.

10 Claims, 10 Drawing Sheets

(51) Int. Cl.
*B29C 39/26* (2006.01)
*B29K 83/00* (2006.01)
*B29L 31/34* (2006.01)

(56) References Cited

U.S. PATENT DOCUMENTS

| | | | | |
|---|---|---|---|---|
| 2,629,135 A | * | 2/1953 | Johnson | B28B 7/0073 |
| | | | | 264/426 |
| 3,755,213 A | * | 8/1973 | Kendall | B29C 33/46 |
| | | | | 521/178 |
| 3,952,991 A | * | 4/1976 | Schneider | B29C 33/46 |
| | | | | 249/66.1 |
| 3,993,727 A | * | 11/1976 | Skriletz | B28B 7/344 |
| | | | | 264/225 |
| 4,046,499 A | * | 9/1977 | Saito | B30B 11/001 |
| | | | | 425/405.2 |
| 4,076,779 A | * | 2/1978 | Skriletz | B28B 7/344 |
| | | | | 134/3 |
| 4,164,523 A | * | 8/1979 | Hanning | B29C 45/1703 |
| | | | | 264/28 |
| 4,413,966 A | * | 11/1983 | Mills | B28B 7/12 |
| | | | | 264/225 |
| 4,546,811 A | | 10/1985 | Potard | |
| 5,728,333 A | * | 3/1998 | Tabata | B29C 33/46 |
| | | | | 264/313 |
| 7,530,807 B2 | | 5/2009 | Ho | |
| 8,268,217 B2 | | 9/2012 | Peters et al. | |
| 8,714,961 B2 | | 5/2014 | Micarelli | |
| 2002/0003319 A1 | * | 1/2002 | Story | B30B 15/32 |
| | | | | 264/335 |
| 2004/0242034 A1 | | 12/2004 | Rinehart et al. | |
| 2018/0029271 A1 | | 2/2018 | Navarra Pruna et al. | |
| 2018/0297901 A1 | | 10/2018 | Droz et al. | |
| 2019/0149025 A1 | | 5/2019 | Gastaldi | |

FOREIGN PATENT DOCUMENTS

| | | |
|---|---|---|
| CN | 104416832 B | 5/2017 |
| DE | 10105770 A1 | 8/2002 |
| EP | 293954 A1 | 12/1988 |
| EP | 0 665 584 A1 | 8/1995 |
| EP | 0713248 A2 | 5/1996 |
| EP | 890425 A1 | 1/1999 |
| JP | 53007881 * | 1/1978 |
| JP | 61014912 * | 1/1986 |
| JP | H0596558 A | 4/1993 |
| JP | 3969344 B2 | 9/2007 |

* cited by examiner

PERMEABLE WALL ENCAPSULATION MOLD

BACKGROUND

Molding is the process of manufacturing an object (e.g., a casting) by shaping liquid or pliable raw material using a rigid frame called a mold, matrix, or setting. The mold may have a hollow interior volume that is filled with the liquid or pliable raw material such as rubber, plastic, glass, metal, or the like. The material hardens or sets inside the mold, adopting a shape matching the interior volume of the mold. The mold may be created using a pattern or model of the final desired product. One common molding process is cast molding, which employs the force of gravity to introduce (e.g., pour) the liquid or pliable raw material into the hollow interior volume of the mold. A release agent may be applied to the hollow interior volume of the mold to make removal of the hardened (e.g., set) casting from the mold easier. Rigid objects may be inserted in the mold prior to or during the molding process such that the liquid or pliable raw material encapsulates the rigid object prior to cooling to a final combination casting.

Silicone is a polymeric organic silicon compound. Silicone rubber is an elastomer (rubber-like material) composed of silicone. Throughout this disclosure, the term silicone will refer to the elastomer form (e.g., silicone rubber). Silicone may be used for water-resistant and heat-resistant components of electrical power systems, such as voltage line insulators, vacuum interrupters, or the like. For example, vacuum interrupters may be encapsulated within an outer silicone layer for additional protection. Silicone is an ideal material for cast molding due its pliable properties above its melting temperature (approximately 300° C.) and its relatively low curing rate. Likewise, silicone may be cast with a two-part addition curing process at room temperatures. However, silicone castings have added challenges during the removal (e.g., ejection) of the casting from the mold.

Ejecting straight-wall, seamless tall silicone castings from a poured cast mold is difficult for many elastic materials, such as silicone rubber, that may exhibit high friction against the interior surface of the mold. High forces are required to retrieve silicone castings from common molds due to the adhesive forces between the exterior surface of the silicone casting and the interior surface of the mold. Typically a taper is used to facilitate ejection of the silicone casting, but in some instances a tapered final product is not usable in electrical applications. Alternatively, a clamshell mold process may be used, but in some instances the seam parting lines (e.g., flash) from the clamshell mold also make the casting unusable in electrical applications. Any protrusion of material on the exterior surface of an insulated electrical component, such as the excess material along the parting line, will cause undesired gaps between the insulated electrical component and an adjacent solid insulation layer. During operation of the electrical component, these gaps may lead to dangerous high voltage breakdowns between the solid insulation layers.

For example, a vacuum interrupter being assembled into a preformed cylindrical straight wall rigid shell (e.g. covering) should not have a parting line as such a line would serve as a fault path, and it should not have a tapered outer form as it would create an air gap that may cause a dielectric breakdown in the primary circuit under certain conditions.

This document describes a novel solution that addresses at least some of the issues described above.

SUMMARY

In an embodiment, a mold for encapsulating an electrical component includes an encapsulation chamber and an air inlet. As an example, in one embodiment, the encapsulation chamber is defined by a housing, an open top, and a solid bottom. Optionally, the bottom may be removable. The housing includes a solid outer wall, a permeable inner wall, and an air chamber between the solid outer wall and the inner wall. Optionally, each of the solid outer wall, the permeable inner wall, and the air chamber may be cylindrical in shape. The air inlet is configured to introduce a gas into the air chamber. The encapsulation chamber may be sized and shaped to receive the electrical component while leaving a gap for the introduction of encapsulant around the electrical component. Optionally, the encapsulant may be silicone rubber. Optionally, the gap may be about 2 mm to about 5 mm.

As an example, in one embodiment, the solid bottom includes at least one ring positioned between the solid outer wall and the permeable inner wall to maintain a gap that forms the air chamber between the solid outer wall and the permeable inner wall. Optionally, the open top includes a planar disc having a central opening and the planar disc includes at least one second ring positioned between the solid outer wall and the permeable inner wall to further maintain the gap that forms the air chamber between the solid outer wall and the permeable inner wall.

As an example, in another embodiment, the air chamber includes a plurality of plenum chambers positioned between the solid outer wall and the permeable inner wall. Optionally, the air inlet may include a plurality of apertures, each of which leads to one of the plenum chambers. Optionally, the housing may include a plurality of plenum sidewall members that extend from the solid outer wall to the permeable inner wall and form the plenum chambers.

In an alternate embodiment, a cast molding process for encapsulating an electrical component includes providing a mold, positioning an electrical component within the mold, introducing an encapsulant into the mold, curing the encapsulant around at least a portion of the electrical component within the mold forming a combination casting, separating the contact surface of the encapsulant from the mold, and ejecting the combination casting from the mold. Optionally, the electrical component may be a vacuum interrupter. Optionally, the encapsulant may be silicone rubber. The step of curing the encapsulant may include forming the combination casting of the silicone rubber at a thickness of about 2 mm to about 5 mm.

As an example, in one embodiment, the mold includes an encapsulation chamber defined by a housing, an open top, a bottom and an air inlet. The housing includes a solid outer wall, a permeable inner wall, and an air chamber between the solid outer wall and inner wall. The air inlet is configured to introduce a gas into the air chamber. During the step of introducing an encapsulant into the mold, the encapsulant is introduced between the electrical component and the permeable inner wall. During the step of separating the contact surface of the encapsulant from the mold, pressurized gas is introduced into the air chamber to pass through the permeable inner wall.

As an example, in another embodiment, the bottom of the mold is openable and closable, a step of enclosing the bottom end of the mold precedes the step of introducing the encapsulant, a step of opening the bottom of the mold precedes the step of introducing the pressurized gas into the air chamber, and the step of ejecting the combination casting includes pressing the combination casting from the bottom through the open top end after the bottom is opened.

As an example, in another embodiment, the electrical component includes a top, a bottom, a cylindrical wall, a first post, and a second post. Optionally, the first post may extend from the top and be positioned within the open top end of the mold. Optionally, the second post may extend from the bottom and be positioned within the bottom end of the mold. Optionally, the steps of introducing the encapsulant and curing the encapsulant may at least partially encapsulate the electrical component in the encapsulant with the top of the electrical component remaining exposed, the bottom of the electrical component remaining exposed, or both the top and bottom of the electrical component remaining exposed.

As an example, in another embodiment, the air chamber includes a plurality of plenum chambers positioned between the solid outer wall and the permeable inner wall. Optionally, the air inlet may include a plurality of apertures, each of which leads to one of the plenum chambers. Optionally, the step of introducing the pressurized gas into the air chamber may include substantially equalizing pressure in the air chamber by introducing pressurized gas into each of the plenum chambers.

In another alternate embodiment, a mold for encapsulating a workpiece includes an encapsulation chamber defined by a housing, an open top, and a solid bottom. As an example, in one embodiment, the housing includes a solid outer wall, a permeable inner wall, and an air chamber between the solid outer wall and the inner wall. Optionally, the air chamber may include a plurality of plenum chambers positioned between the solid outer wall and the permeable inner wall. Optionally, the solid outer wall may also include a plurality of air inlets, each of which leads to one of the plenum chambers.

DETAILED DESCRIPTION

Terminology that is relevant to this disclosure is provided at the end of this detailed description. The illustrations are not to scale.

Figure 1:
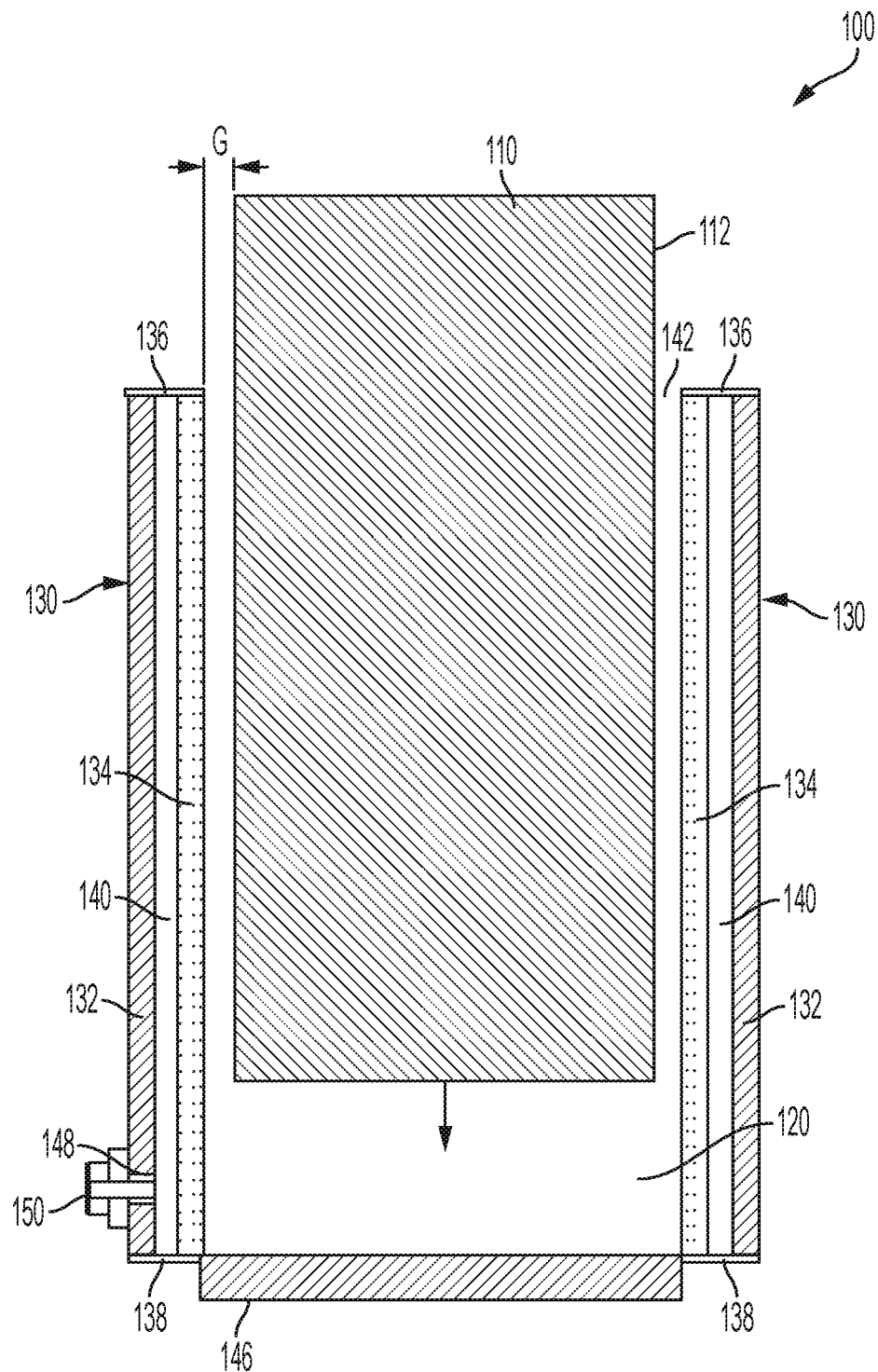
FIG. 1 is a sectional view of an example mold for encapsulating an electrical component employing a permeable inner wall during a mold process.

FIG. 1 is a sectional view of an example mold 100 for encapsulating a workpiece such as an electrical component 110. The mold 100 employs a permeable inner wall 134 during a mold process. The mold 100 may include an encapsulation chamber 120 for receiving the electrical component 110, and an air inlet 150 that provides a path by which air from outside of the mold 100 may be forced into the mold 100.

The encapsulation chamber 120 may be defined by an interior volume of a housing 130. The housing 130 may include an outer wall 132, an inner wall 134, a top wall 136, and a bottom wall 138. An air chamber 140 may be defined by the volume between the outer wall 132 and the inner wall 134, optionally from the top wall 136 to the bottom wall 138 or between any points between the top and bottom walls. Optionally, the top wall 136 and/or bottom wall 138 may be removable, and the inner wall 134 may be separated from the outer wall 132. Alternatively, the outer wall 132, inner wall 134, top wall 136, and bottom wall 138 may be integral.

Figure 3:
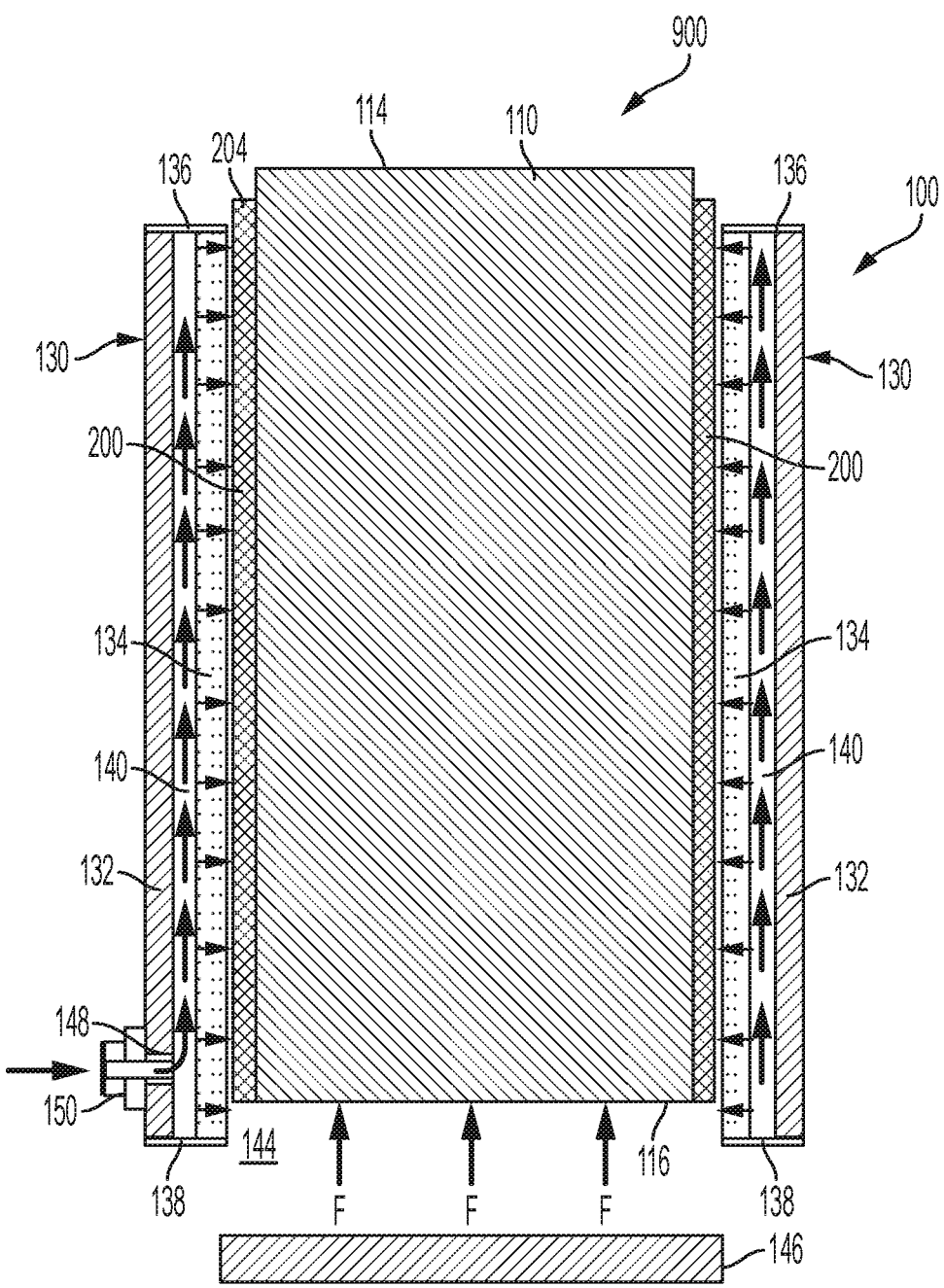
FIG. 3 is a sectional view of the mold in FIG. 1 during an ejection process.

The top wall 136 may include an upper opening 142 and the bottom wall 138 may include a lower opening 144 (see FIG. 3). A removable plate 146 may be positioned within the lower opening 144. For example, the encapsulation chamber 120 may be defined as the volume within the inner wall 134 from the upper opening 142 to the plate 146 filling the lower opening 144.

The outer wall 132, top wall 136, and bottom wall 138 may be solid in that they have a porosity value (i.e., the measurement of voids within a solid) small enough to prevent gas from passing through the outer wall 132, top wall 136, and bottom wall 138 from the air chamber 140 to the exterior of the housing 130, as will be described in more detail below. (Note: the term "solid", when used in this document to refer to a wall, does not mean that the wall must be fully solid. Instead, it means that either the inner surface or the outer surface of the wall must be substantially impermeable to air as described above.) The outer wall 132 may also include an aperture 148 configured to receive the air inlet 150 and to be a conduit for the gas to enter the air chamber 140. The inner wall 134 may be permeable and have a porosity value large enough to allow gas to pass through the inner wall 134 from the air chamber 140 to the interior of the encapsulation chamber 120, but not so porous as to allow encapsulation material to pass through the inner wall 134, as will be described in more detail below. For example, the inner wall 134 may be made from stainless steel, bronze, aluminum, or any material having suitable controlled porosity. The air inlet 150 may be configured to introduce a gas into the air chamber 140. The gas may be a pressurized gas, as will be described in more detail below.

Figure 2:
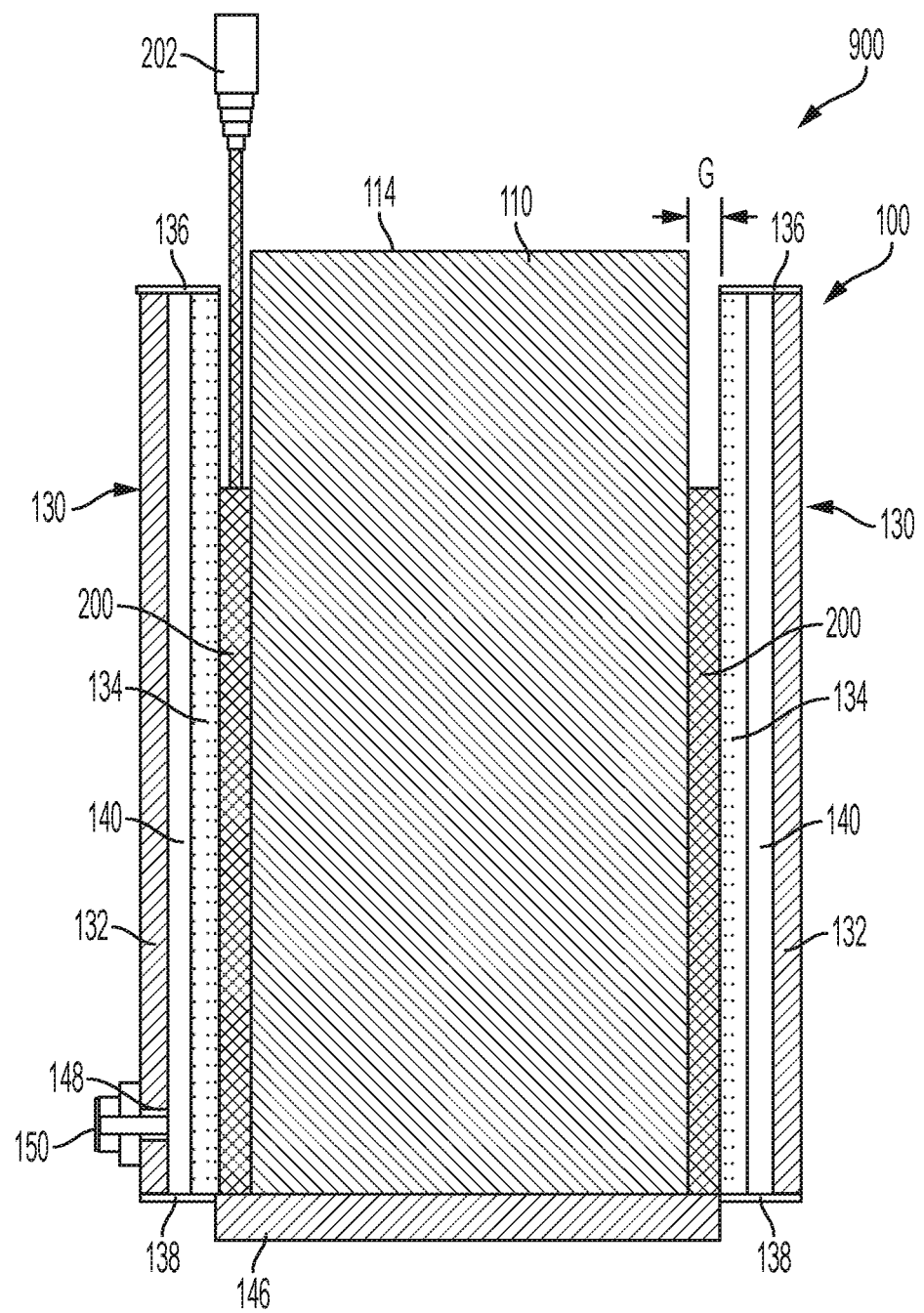
FIG. 2 is a sectional view of the mold in FIG. 1 during an encapsulation process.

The encapsulation chamber 120 may be sized to substantially conform to the size and shape of the electrical component 110 or other workpiece while leaving a gap G for the introduction of encapsulant 200 (see FIG. 2). For example, the encapsulation chamber 120 may be cylindrical, cubical, or the like.

As illustrated in FIG. 1, the electrical component 110 (or other workpiece) may be positioned within the encapsulation chamber 120 to provide an even gap G between the sidewalls 112 of the electrical component 110 and the inner wall 134 of the housing 130. The electrical component 110 may be any device that can benefit from electrical insulation. For example, the electrical component 110 may be a circuit breaker, switch, motor, generator, battery, resistor, transistor, capacitor, inductor, transformer, relay, integrated circuit, microprocessor, or the like. An example circuit breaker component requiring electrical insulation may be a vacuum interrupter, such as vacuum interrupter 900 shown in FIG. 9.

FIG. 2 is a sectional view of the mold 100 in FIG. 1 during an encapsulation process. The encapsulant 200 is a material for encapsulating the electrical component 110 or other workpiece forming a combination casting. For example, the encapsulant 200 may be silicone rubber, Ethylene Propylene Diene Monomer (EPDM) rubber, polyurethane rubber, or the like. The thickness of the encapsulant 200 may be any thickness providing proper electrical insulation. For example, an encapsulant 200 thickness may be from about 0.25 mm to about 100 mm, from about 0.5 mm to about 50 mm, from about 1 mm to about 25 mm, or from about 2 mm to about 5 mm. During the encapsulating process, liquid encapsulant 200 is poured from a source through a controllable valve 202 into the gap G between the electrical component 110 and the encapsulation chamber 120. Once the electrical component 110 is encapsulated with encapsulant 200 to the desired height, the valve 202 is closed and the source of liquid encapsulant 200 is removed. The sidewalls 112 of the electrical component 110 may be at least partially encapsulated in encapsulant 200 or alternatively the liquid encapsulant may be allowed to also cover the upper surface 114 of the electrical component 110. The electrical component 110 may rest directly on the plate 146 of the housing 130 or alternatively may be spaced from the plate 146 to allow for encapsulant 200 to also encapsulate the lower surface 116 of the electrical component 110.

FIG. 3 is a sectional view of the mold 100 in FIG. 1 during an ejection process. After the liquid encapsulant 200 is allowed to cure (i.e. allowed for the encapsulant 200 to cool to a temperature below the melting point and return to a solid state) the plate 146 of the encapsulation chamber 120 may be removed. The contact surface 204 of the encapsulant 200 is the surface of the encapsulant 200 in direct contact with the housing 130, especially the inner wall 134. The adhesive forces between the contact surface 204 of the encapsulant 200 and the housing 130 require additional forces to eject the combination casting without damage to the electrical component 110 and/or the encapsulant 200. Gas is introduced into the air chamber 140 of the housing 130 from the air inlet 150 through the aperture 148 in the outer wall 132 of the housing 130. As the pressure of the gas within the air chamber 140 increases, the pressurized gas is forced through the voids of the permeable inner wall 134 of the housing 130 and against the contact surface 204 of the encapsulant 200 to push uniformly against the encapsulant 200, thus providing the additional force to counteract the adhesive forces. As the gas exits the permeable inner wall 134 into the encapsulation chamber 120, a thin layer of gas separates the contact surface 204 of the encapsulant 200 from the encapsulation chamber 120. This thin layer of gas allows the ejection of the combination casting from the encapsulation chamber 120 with significantly reduced push-out force F or damage to the electrical component 110 and/or encapsulant 200.

Figure 4:
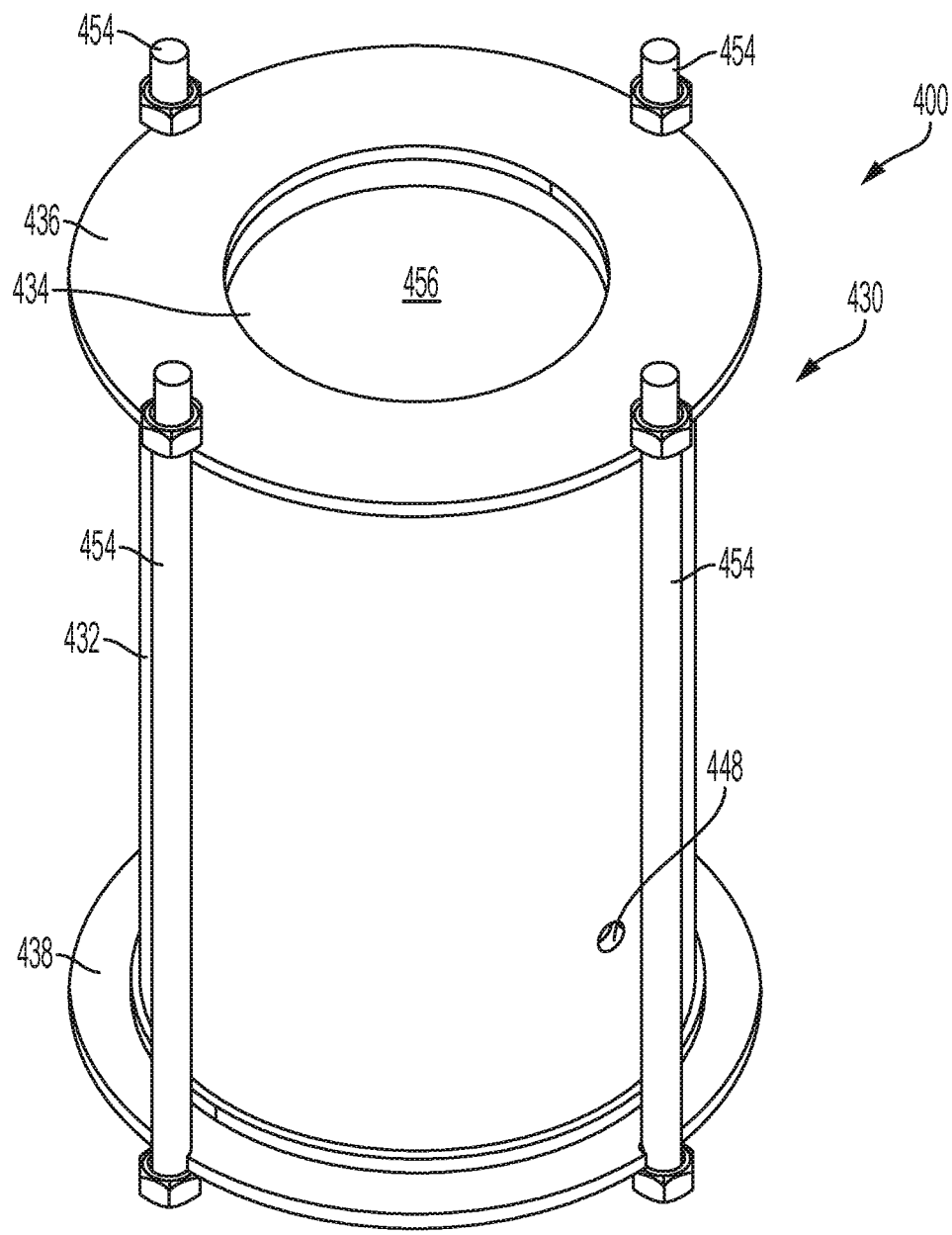
FIG. 4 is an isometric view of an example mold for encapsulating an example vacuum interrupter employing a silicone encapsulant.
Figure 5:
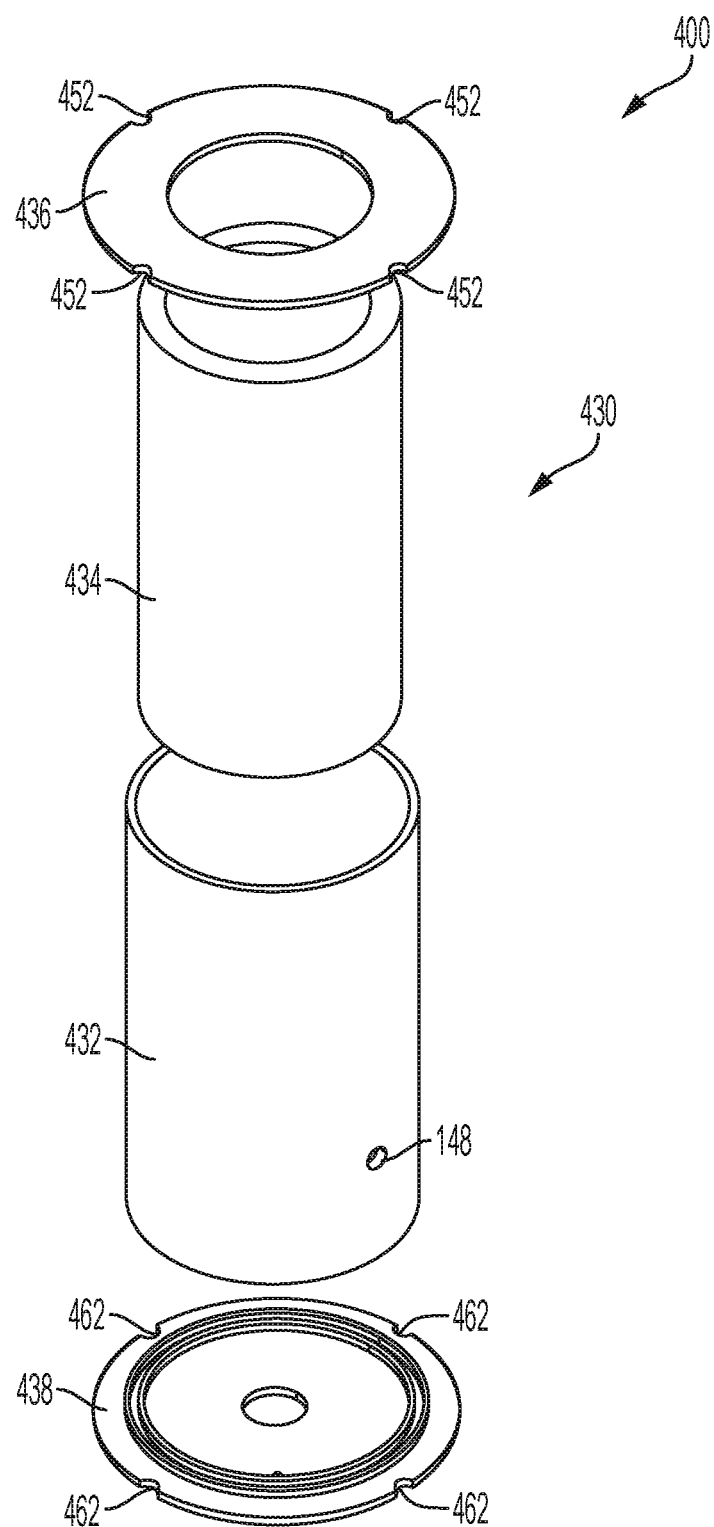
FIG. 5 is an expanded view of the mold in FIG. 4.
Figure 6:
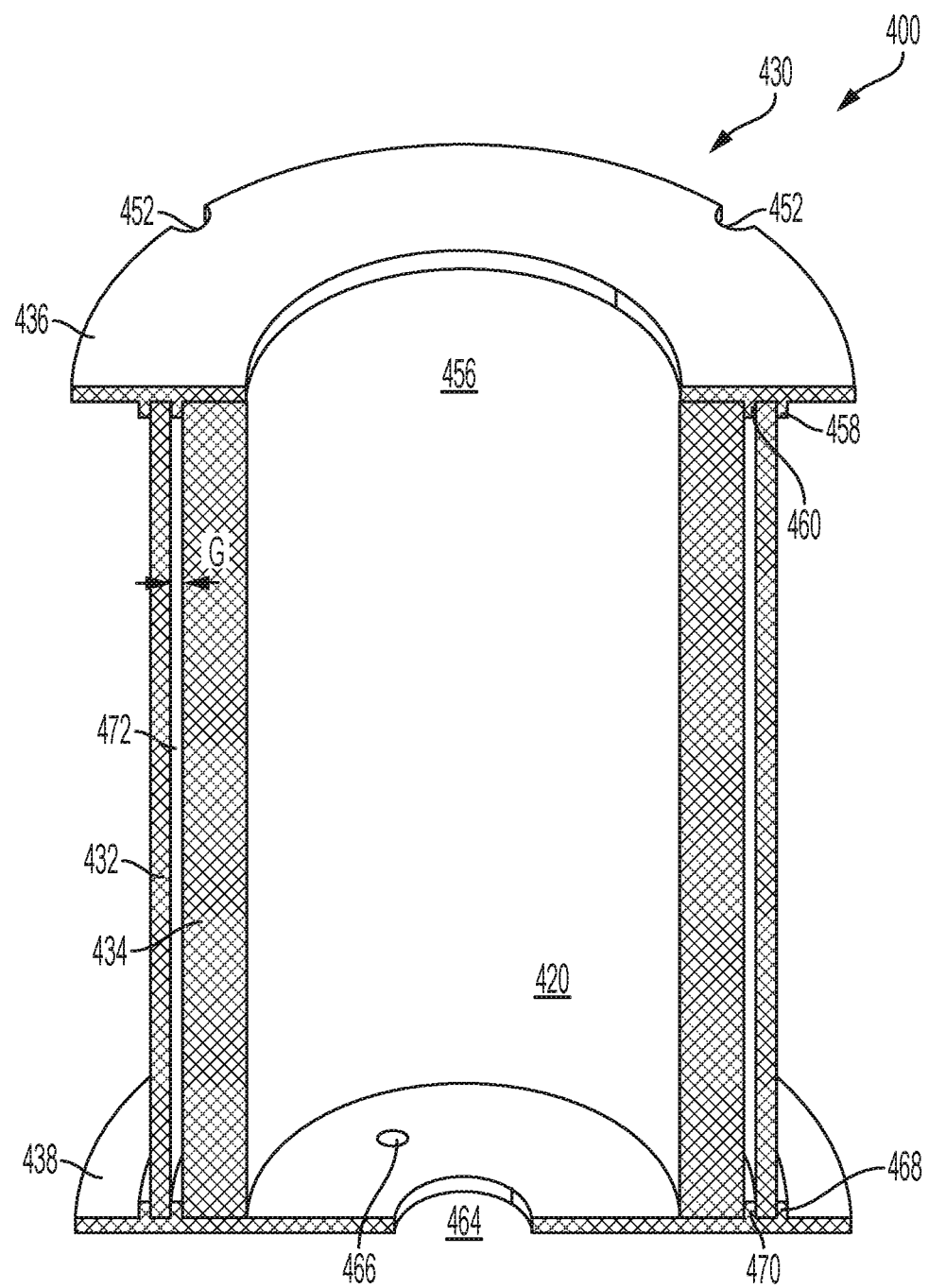
FIG. 6 is a sectional view of the mold in FIG. 4.

FIG. 4 is an isometric view of another example mold 400 for encapsulating a workpiece such as a vacuum interrupter 900 or other electrical component employing a silicone encapsulant 200. FIG. 5 is an expanded view of the mold 400 in FIG. 4. FIG. 6 is a sectional view of the mold 400 in FIG. 4. Mold 400 is similar in operation to the mold 100 described above, but with additional features.

Referring to FIGS. 4-6 together, mold 400 may include an encapsulation chamber 420 for receiving the vacuum interrupter or other workpiece. The encapsulation chamber 420 may be defined by an interior volume of a housing 430. The housing 430 may include an outer wall 432, an inner wall 434, a top 436, and a bottom 438. The outer wall 432 may have a cylindrical shape. The outer wall 432 may also have one or more apertures 448 for receiving an air inlet 150. The inner wall 434 may also have a cylindrical shape having an outer diameter smaller than the inner diameter of the outer wall 432. The inner wall 434 may be positioned within the outer wall 432 creating a gap G between the inner wall 434 and outer wall 432. The top 436 may be a planar disc having a plurality of locking notches 452 along the perimeter for receiving locking bolts 454 or other locking members. The top 436 may have a central opening 456 for receiving the workpiece and the liquid encapsulant 200. The top 436 may also have a pair of nested rings 458, 460 on the lower surface for maintaining a gap G between the outer wall 432 and inner wall 434. The bottom 438 may also be a planar disc having a plurality of locking notches 462 along the perimeter and aligned with the locking notches 452 of the top 436 for receiving the locking bolts 454. If the workpiece is a vacuum interrupter, an upper terminal post 902 of the vacuum interrupter 900 may extend through the central opening 456 in the top 436 while the bottom 438 may also have a central opening 464 for receiving a lower terminal post 904 of the vacuum interrupter 900 and one or more annular apertures 466 for filling the encapsulation chamber 420 with liquid encapsulant 200 from below. The bottom 438 may have a matching pair of nested rings 468, 470 on the upper surface similar in size and shape as the nested rings 458, 460 of the top 436. The top and bottom nested rings 458, 460, 468, 470 maintain the spacing of the outer wall 432 from the inner wall 434 and, combined with the lower surface of the top 436, the inner surfaces of the outer wall 432 and inner wall 434, and the upper surface of the bottom 438 form a sealed air chamber 472. For example, an inner ring 460 on the top 436 may be positioned between the outer wall 432 and the inner wall 434 to further maintain the gap G that forms the air chamber 472 between the outer wall 432 and the inner wall 434. Likewise, an inner ring 470 on the bottom 438 may be positioned between the outer wall 432 and the inner wall 434 to further maintain the gap G that forms the air chamber 472 between the outer wall 432 and the inner wall 434. The locking bolts 454 may be removed from the top 436 and bottom 438 allowing the mold 400 to be disassembled (see FIG. 5) for repair and/or replacement of parts. For example, the mold 400 may include a selection of inner walls having various inner diameters. An inner wall 434 may be selected for each different vacuum interrupter 900 or for each desired encapsulant 200 thickness. Likewise, the mold 400 may include a selection of paired outer and inner walls having various heights. A pair of matching outer and inner walls 432, 434 may be selected for vacuum interrupters having different heights.

Figure 7:
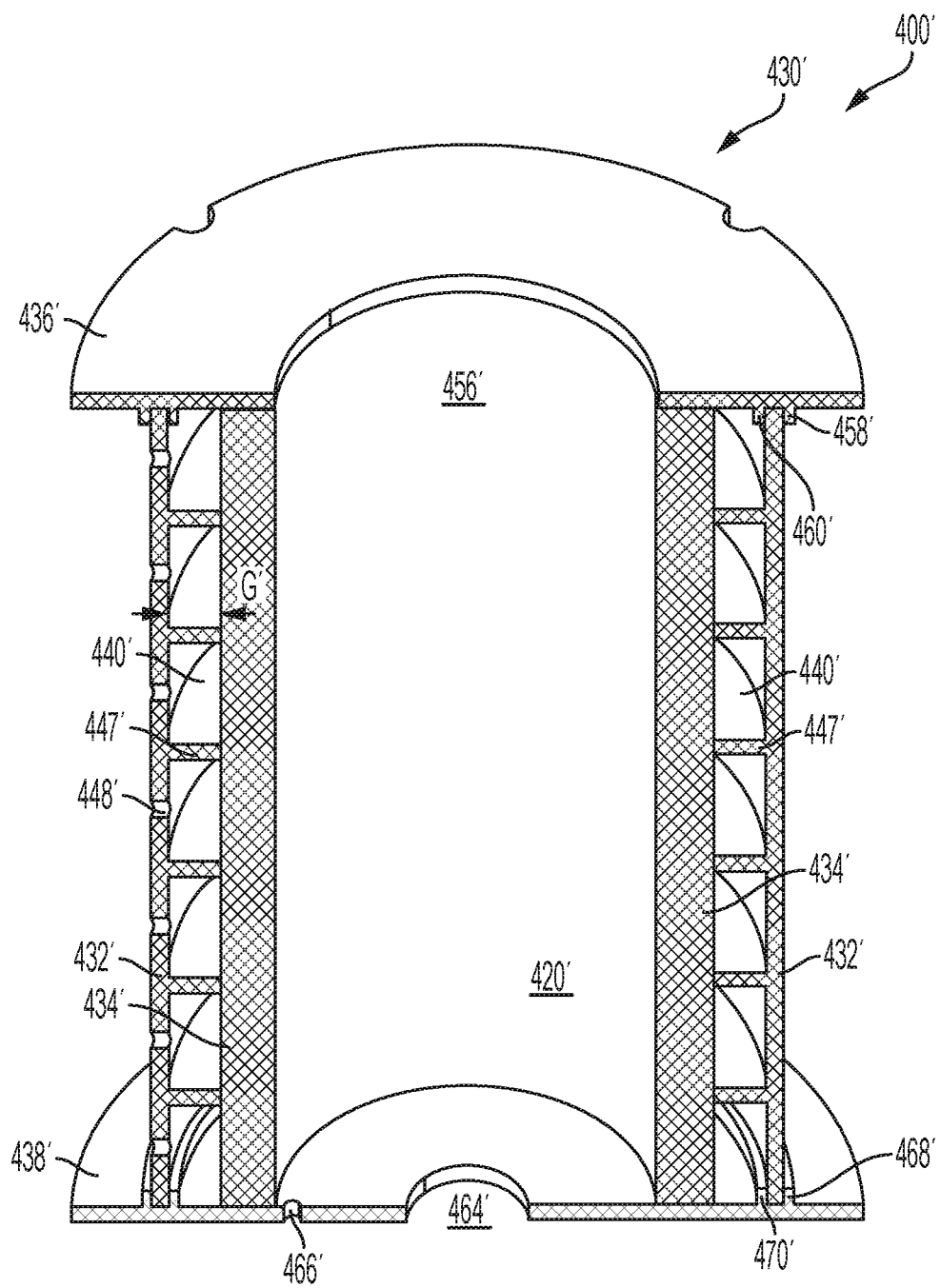
FIG. 7 is a sectional view of another example mold similar to that of FIG. 6.

FIG. 7 is a sectional view of another example mold 400' similar to that of FIG. 6. Mold 400' differs from mold 400 by a modified housing 430'. The housing 430' may include an outer wall 432', an inner wall 434', a top 436', and a bottom 438'. The outer wall 432' and inner wall 434' each may have a cylindrical shape. Plenum chambers 440' may be formed by plenum sidewall members 447' that extend inwardly from the outer wall 432' to the inner wall 434'. Plenum sidewall members 447' may reinforce the outer wall 432'. The outer wall 432' may also have one or more apertures 448', each of which serves as an air inlet that leads to a plenum chamber 440'. Thus, in this embodiment instead of having one air chamber between the outer and inner walls, multiple plenum chambers 440' provide multiple air chambers between the outer wall 432' and the inner wall 434'. This design may help to avoid all of the pressure being relieved in areas already cleared by an ejecting workpiece, which could reduce the fluid cushion effect and make the workpiece stick on the way out. Also, feeding multiple plenum chambers rather than a single larger chamber can help substantially equalize pressure along the workpiece and help retain a fluidizing layer between outer and inner walls. The inner wall 434' may be positioned within the outer wall 432' so that the plenum chambers are positioned within a gap G' between the inner wall 434' and the outer wall 432'. The top 436' may be a planar disc. The top 436' may have a central opening 456' for receiving the workpiece and the liquid encapsulant 200. The top 436' may also have a pair of nested rings 458', 460' on the lower surface for maintaining a gap G' between the outer wall 432' and the inner wall 434'. The bottom 438' may also be a planar disc. If the workpiece is a vacuum interrupter, the bottom 438' may also have a central opening 464' for receiving a lower terminal post 904 of the vacuum interrupter 900 and one or more annular apertures 466' for filling the encapsulation chamber 420' with liquid encapsulant 200 from below. The bottom 438' may have a matching pair of nested rings 468', 470' on the upper surface similar in size and shape as the nested rings 458', 460' of the top 436'. The top and bottom nested rings 458', 460', 468', 470' maintain the spacing of the outer wall 432' from the inner wall 434'.

The gap G' of the modified mold 400' may be larger than the gap G of the mold 400 providing for a larger total volume in the plenum chambers 440' compared to the total volume of a single sealed air chamber between the outer and inner walls.

Figure 8A:
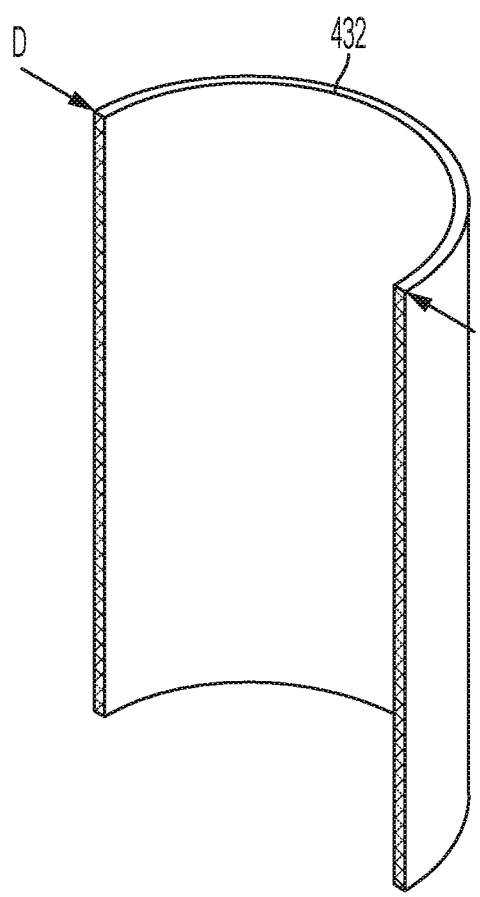
FIG. 8A is an isometric sectional view of an outer wall of the mold housing of FIG. 6.
Figure 8B:
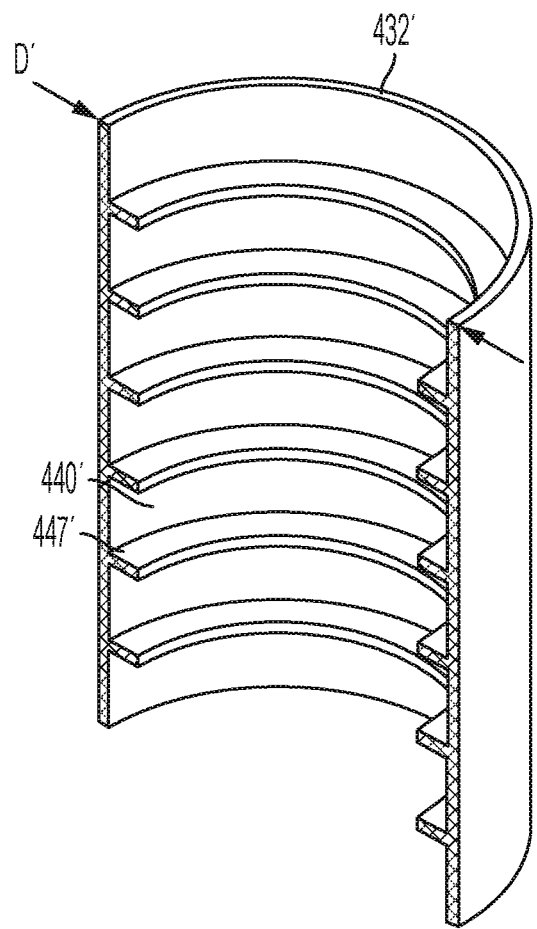
FIG. 8B is an isometric sectional view of an outer wall of the mold housing of FIG. 7.

FIG. 8A is an isometric sectional view of the outer wall 432 of the mold housing 430 of FIG. 6, while FIG. 8B is an isometric sectional view of the outer wall 432' of the mold housing 430' of FIG. 7 with plenum sidewall members 447' attached. For example, in comparison of outer wall 432 and an outer wall 432' applied to a common inner wall 434, the overall diameter D of the outer wall 432 may be smaller than the overall diameter D' of the outer wall 432'.

Figure 9:
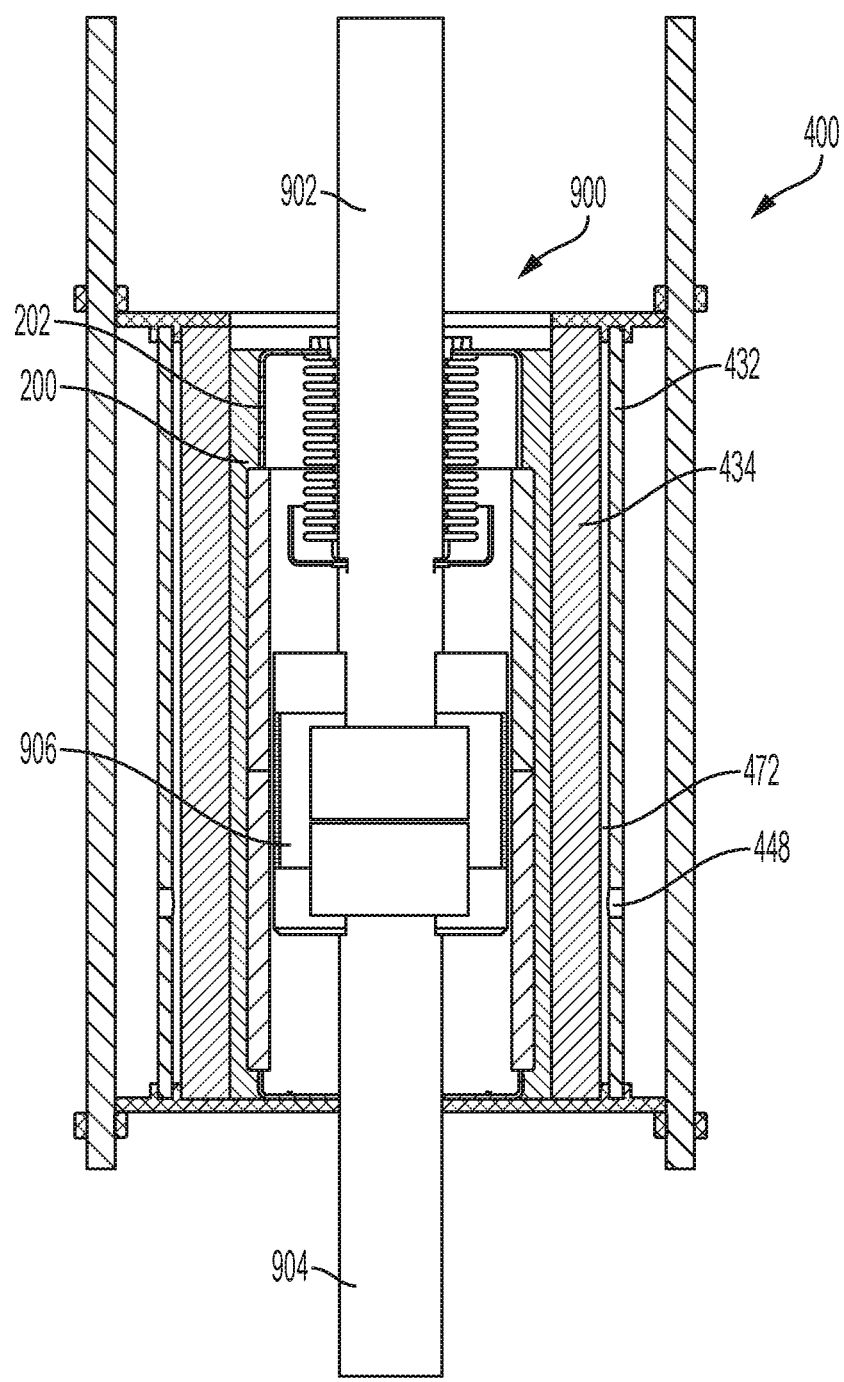
FIG. 9 is a sectional view of a mold with an example encapsulated vacuum interrupter inside the mold.

FIG. 9 is a sectional view of a mold 400 with an example vacuum interrupter 900 partially surrounded by silicone encapsulant 200 inside the mold 400. The vacuum interrupter 900 may have a substantially cylindrical middle section 906. The encapsulant 200 may be cured around the cylindrical middle section 906 of the vacuum interrupter 900 within the encapsulation chamber 420. Gas may be introduced into the air chamber 472 via aperture 448 releasing the contact surface 204 of the encapsulant 200 from the inner wall 434 as described above. The extending lower terminal post 904 may be pressed or the bottom 438 may be removed and the underside of the electrical component 110 may be pressed to lift the combination casting from the encapsulation chamber 420. During the molding process, the lower terminal post 904 may be secured to the bottom of the mold, such as by a locking nut or other securing structure.

Figure 10:
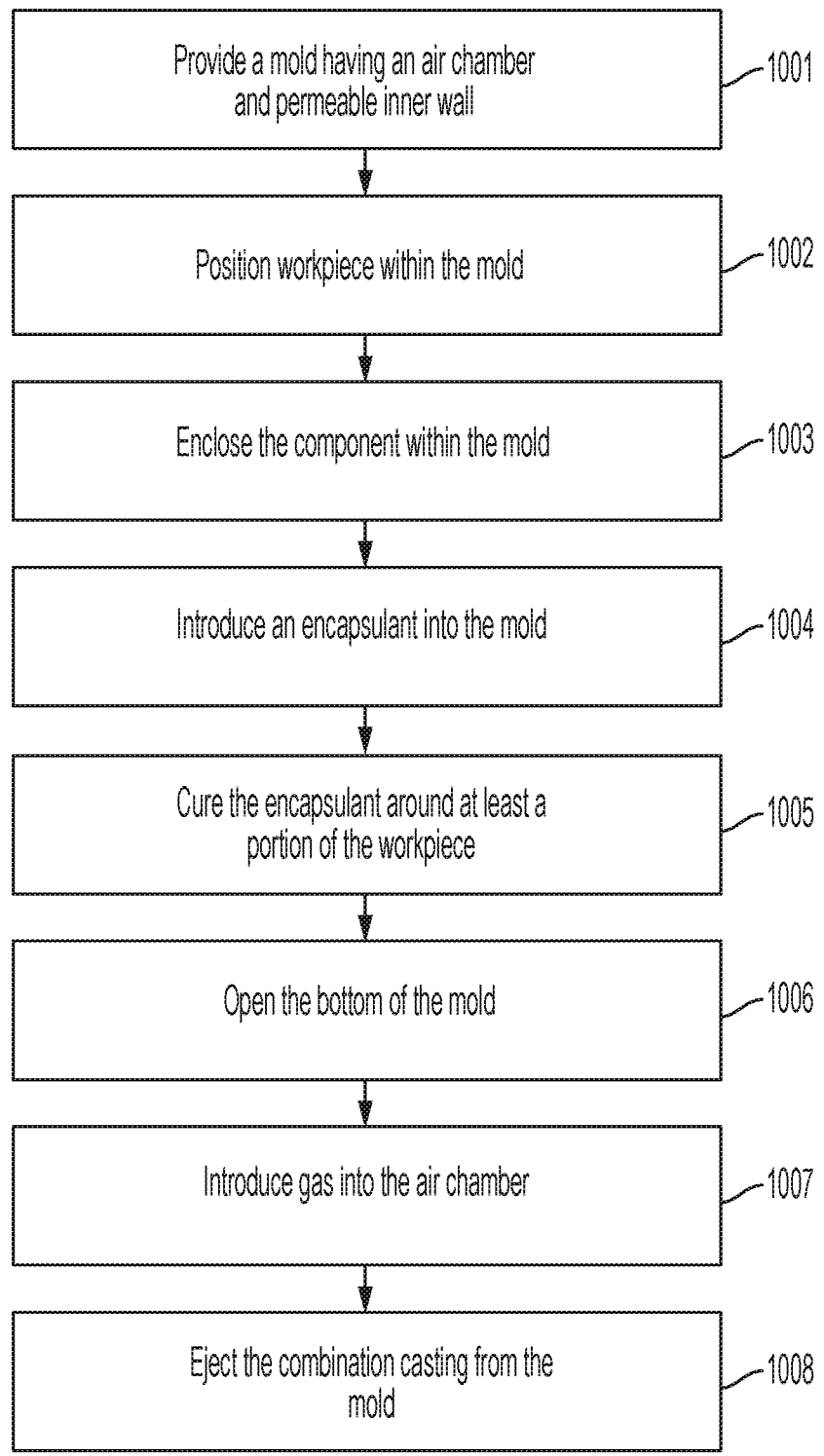
FIG. 10 is a flowchart illustrating an example method for manufacturing a combination casting, according to an embodiment.

FIG. 10 presents a flowchart for a method of cast molding. For example, a method of cast molding a workpiece or other electrical component and may include: (a) at 1001, providing a mold having an air chamber between a solid outer wall and a permeable inner wall; (b) at 1002, positioning the workpiece or other electrical component within the mold; (c) at 1003, enclosing the workpiece within the mold (although the top may optionally remain open); (d) at 1004, introducing an encapsulant into the mold between the workpiece and the permeable inner wall; (e) at 1005, curing the encapsulant around at least a portion of the electrical component within the mold forming a combination casting; (f) at 1006, optionally opening the bottom end of the mold; (g) at 1007, introducing gas into the air chamber to pass through the permeable inner wall separating the contact surface of the encapsulant from the mold; and (h) at 1008, removing the combination casting from the mold, such as by pressing the combination casting from the open bottom end to eject the combination casting from the top end of the mold.

The combination casting may be positioned within a cylindrical covering (e.g., rigid outer shell) as a final product. An example encapsulated pole unit teaching may be found in U.S. Pat. No. 7,852,180, the disclosure of which is fully incorporated into this document by reference. An example pressed-in mechanism with a membrane switch teaching may be found in U.S. Pat. No. 8,674,254, the disclosure of which is fully incorporated into this document by reference. It is desirable to have no air gaps between the vacuum interrupter and the covering. The encapsulant helps to avoid air gaps between the vacuum interrupter and the covering. This is particularly applicable to vacuum interrupters, where a silicone encapsulation serves as an electrically insulating mechanical interface layer between the vacuum interrupter and the covering as part of an encapsulated pole unit or other switchgear components.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The terms "about" or "approximately," when used in connection with a numeric value, are intended to include values that are close to, but not exactly, the number. For example, in some embodiments, the terms "about" or "approximately" may include values that are within +/−10 percent of the value.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A mold for encapsulating an electrical component, the mold comprising:
   an encapsulation chamber for receiving an electrical component, the encapsulation chamber defined by:

a housing comprising a solid outer wall, a permeable inner wall, and an air chamber between the solid outer wall and the permeable inner wall, an open top, a lower opening, and a solid removable bottom positioned within the lower opening; and an air inlet configured to introduce a gas into the air chamber;

wherein the encapsulation chamber is sized and shaped to receive the electrical component while leaving a gap for the introduction of encapsulant around the electrical component.

2. The mold of claim 1, wherein the encapsulant comprises silicone rubber.

3. The mold of claim 1, wherein the gap is about 2 mm to about 5 mm.

4. The mold of claim 1, wherein:

the air chamber comprises a plurality of plenum chambers positioned between the solid outer wall and the permeable inner wall; and the air inlet comprises a plurality of apertures, each of which leads to one of the plenum chambers.

5. The mold of claim 4, further comprising a plurality of plenum sidewall members that extend from the solid outer wall to the permeable inner wall and form the plenum chambers.

6. The mold of claim 1, wherein each of the solid outer wall, the permeable inner wall, and the air chamber are cylindrical in shape.

7. The mold of claim 1, wherein the solid bottom comprises at least one ring positioned between the solid outer wall and the permeable inner wall to maintain a gap that forms the air chamber between the solid outer wall and the permeable inner wall.

8. The mold of claim 7, wherein:

the open top comprises a planar disc having a central opening; and the planar disc comprises at least one second ring positioned between the solid outer wall and the permeable inner wall to further maintain the gap that forms the air chamber between the solid outer wall and the permeable inner wall.

9. A mold for encapsulating a workpiece, the mold comprising:

an encapsulation chamber defined by:

a housing comprising a solid outer wall, a permeable inner wall, and an air chamber between the solid outer wall and the permeable inner wall, an open top, and a solid, wherein the solid bottom comprises at least one ring positioned between the solid outer wall and the permeable inner wall to maintain a gap that forms the air chamber between the solid outer wall and the permeable inner wall;

wherein:

the air chamber comprises a plurality of plenum chambers positioned between the solid outer wall and the permeable inner wall, and the solid outer wall comprises a plurality of air inlets, each of which leads to one of the plenum chambers.

10. The mold of claim 9, wherein the solid bottom includes a plurality of locking notches along a perimeter of the solid bottom, each locking notch of the plurality of locking notches configured for receiving locking members.

* * * * *